(12) United States Patent
Hu

(10) Patent No.: US 11,662,553 B2
(45) Date of Patent: May 30, 2023

(54) CAMERA OPTICAL LENS

(71) Applicant: AAC Optics (Changzhou) Co., Ltd., Changzhou (CN)

(72) Inventor: Tiantian Hu, Shenzhen (CN)

(73) Assignee: AAC Optics (Changzhou) Co., Ltd., Changzhou (CN)

( * ) Notice: Subject to any disclaimer, the term of this patent is extended or adjusted under 35 U.S.C. 154(b) by 383 days.

(21) Appl. No.: 17/131,756

(22) Filed: Dec. 23, 2020

(65) Prior Publication Data
US 2021/0263280 A1 Aug. 26, 2021

(30) Foreign Application Priority Data
Feb. 24, 2020 (CN) .......................... 202010111312.5

(51) Int. Cl.
*G02B 9/60* (2006.01)
*G02B 13/00* (2006.01)
*G02B 27/00* (2006.01)

(52) U.S. Cl.
CPC ........... *G02B 9/60* (2013.01); *G02B 13/0045* (2013.01); *G02B 27/0025* (2013.01)

(58) Field of Classification Search
None
See application file for complete search history.

(56) References Cited

U.S. PATENT DOCUMENTS

| | | | | |
|---|---|---|---|---|
| 8,325,429 B2* | 12/2012 | Tang | .................. | G02B 13/0045 |
| | | | | 359/764 |
| 8,488,259 B2* | 7/2013 | Chen | ..................... | G02B 13/22 |
| | | | | 359/764 |
| 2012/0314301 A1* | 12/2012 | Huang | ............... | G02B 13/0045 |
| | | | | 359/713 |
| 2013/0010374 A1* | 1/2013 | Hsieh | ..................... | G02B 13/18 |
| | | | | 359/714 |
| 2015/0146309 A1* | 5/2015 | Ota | ..................... | G02B 13/0045 |
| | | | | 359/757 |
| 2016/0349486 A1* | 12/2016 | Teraoka | ............. | G02B 13/0045 |

* cited by examiner

*Primary Examiner* — Darryl J Collins
(74) *Attorney, Agent, or Firm* — W&G Law Group

(57) ABSTRACT

Provided is a camera optical lens, including first to fifth lenses. The camera optical lens satisfies: $-3.50 \leq f2/f \leq -1.50$; $10.00 \leq d1/d2 \leq 35.00$; $1.80 \leq (R5+R6)/(R5-R6) \leq 8.00$; $R9/d9 \leq -15.00$; and $-30.00 \leq R2/R1 \leq -10.00$, where f denotes a focal length of the camera optical lens; f2 denotes a focal length of the second lens; d1 denotes an on-axis thickness of the first lens; d2 denotes an on-axis distance from an image side surface of the first lens to an object side surface of the second lens; R5 and R6 denote curvature radiuses of an object side surface and an image side surface of the third lens, respectively; d9 denotes an on-axis thickness of the fifth lens; and R1 and R2 denote curvature radiuses of an object side surface and the image side surface of the first lens. The camera optical lens has good optical performance and satisfies the requirement for ultra-thin design.

10 Claims, 9 Drawing Sheets

CAMERA OPTICAL LENS

TECHNICAL FIELD

The present disclosure relates to the field of optical lens, and more particularly, to a camera optical lens suitable for handheld terminal devices such as smart phones or digital cameras and camera devices such as monitors or PC lenses.

BACKGROUND

With the emergence of smart phones in recent years, the demand for miniature camera lens is increasing day by day, but in general the photosensitive devices of camera lens are nothing more than Charge Coupled Device (CCD) or Complementary Metal-Oxide Semiconductor Sensor (CMOS sensor), and as the progress of the semiconductor manufacturing technology makes the pixel size of the photosensitive devices become smaller, plus the current development trend of electronic products towards better functions and thinner and smaller dimensions, miniature camera lenses with good imaging quality therefore have become a mainstream in the market.

In order to obtain better imaging quality, the lens that is traditionally equipped in mobile phone cameras adopts a three-piece or four-piece lens structure. Also, with the development of technology and the increasing diverse demands from users, the pixel area of photosensitive devices is becoming smaller and smaller and the requirement of the system on the imaging quality is increasingly higher, such that a five-piece lens structure gradually emerges in lens designs. It is urgent to provide an ultra-thin camera lens having excellent optical characteristics and long focal-length.

SUMMARY

The present disclosure provides a camera optical lens, which has good optical performance and satisfies the requirement for ultra-thin design.

In an embodiment, the present disclosure provides a camera optical lens. The camera optical lens includes a first lens having a positive refractive power, a second lens having a negative refractive power, a third lens having a negative refractive power, a fourth lens having a positive refractive power, and a fifth lens having a negative refractive power successively from an object side to an image side, As an improvement, the camera optical lens further satisfies a following condition: $1.50 \leq R4/f \leq 10.00$, where R4 denotes a curvature radius of an image side surface of the second lens.

As an improvement, the camera optical lens further satisfies following conditions: $0.36 \leq f1/f \leq 1.33$; $-1.87 \leq (R1+R2)/(R1-R2) \leq -0.55$; and $0.12 \leq d1/TTL \leq 0.46$, where f1 denotes a focal length of the first lens; and TTL denotes a total optical length from the object side surface of the first lens to an image plane of the camera optical lens along an optic axis.

As an improvement, the camera optical lens further satisfies following conditions: $-1.58 \leq (R3+R4)/(R3-R4) \leq 3.01$; and $0.02 \leq d3/TTL \leq 0.08$, where R3 denotes a curvature radius of the object side surface of the second lens; R4 denotes a curvature radius of an image side surface of the second lens; d3 denotes an on-axis thickness of the second lens; and TTL denotes a total optical length from the object side surface of the first lens to an image plane of the camera optical lens along an optic axis.

As an improvement, the camera optical lens further satisfies following conditions: $-8.11 \leq f3/f \leq -1.23$; and $0.02 \leq d5/TTL \leq 0.12$, where f3 denotes a focal length of the third lens; d5 denotes an on-axis thickness of the third lens; and TTL denotes a total optical length from the object side surface of the first lens to an image plane of the camera optical lens along an optic axis.

As an improvement, the camera optical lens further satisfies following conditions: $0.32 \leq f4/f \leq 1.49$; $-0.75 \leq (R7+R8)/(R7-R8) \leq 0.65$; and $0.05 \leq d7/TTL \leq 0.45$, where f4 denotes a focal length of the fourth lens; R7 denotes a curvature radius of an object side surface of the fourth lens; R8 denotes a curvature radius of an image side surface of the fourth lens; d7 denotes an on-axis thickness of the fourth lens; and TTL denotes a total optical length from the object side surface of the first lens to an image plane of the camera optical lens along an optic axis.

As an improvement, the camera optical lens further satisfies following conditions: $-1.36 \leq f5/f \leq -0.41$; $0.38 \leq (R9+R10)/(R9-R10) \leq 1.37$; and $0.03 \leq d9/TTL \leq 0.24$, where f5 denotes a focal length of the fifth lens; R10 denotes a curvature radius of an image side surface of the fifth lens; and TTL denotes a total optical length from the object side surface of the first lens to an image plane of the camera optical lens along an optic axis.

As an improvement, the camera optical lens further satisfies a following condition: $TTL/IH \leq 2.00$, where TTL denotes a total optical length from the object side surface of the first lens to an image plane of the camera optical lens along an optic axis; and IH denotes an image height of the camera optical lens.

As an improvement, the camera optical lens further satisfies a following condition: $0.49 \leq f12/f \leq 1.81$, where f12 denotes a combined focal length of the first lens and the second lens.

As an improvement, the camera optical lens further satisfies a following condition: $Fno \leq 3.17$, where Fno denotes an F number of the camera optical lens.

The present disclosure has the following beneficial effects: the camera optical lens has good optical performance and satisfies the requirement for ultra-thin design.

BRIEF DESCRIPTION OF DRAWINGS

Many aspects of the exemplary embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DESCRIPTION OF EMBODIMENTS

The present disclosure will hereinafter be described in detail with reference to several exemplary embodiments. To make the technical problems to be solved, technical solutions and beneficial effects of the present disclosure more apparent, the present disclosure is described in further detail together with the figure and the embodiments. It should be understood the specific embodiments described hereby is only to explain the disclosure, not intended to limit the disclosure.

Embodiment 1

Figure 1:
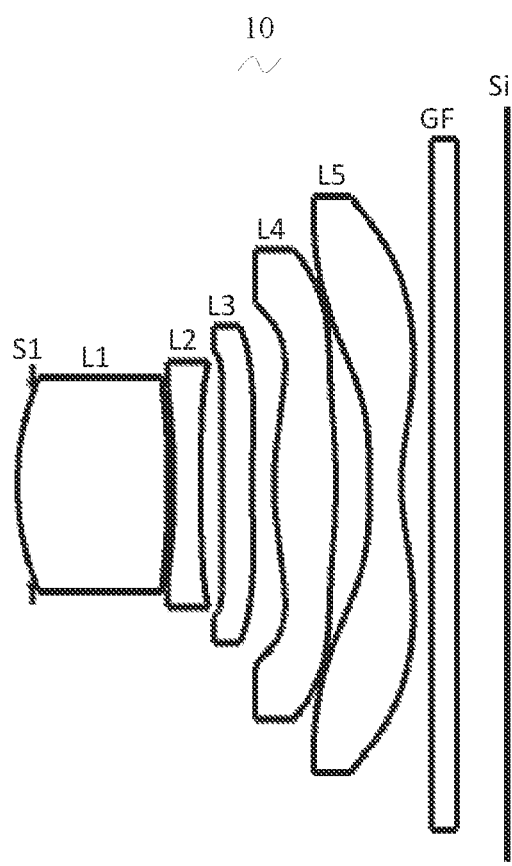
FIG. 1 is a structural schematic diagram of a camera optical a camera optical lens according to Embodiment 1 of the present disclosure.

Referring to FIG. 1 to FIG. 4, the present disclosure provides a camera optical lens 10 according to a first embodiment. In FIG. 1, the left side is an object side, and the right side is an image side. The camera optical lens 10 mainly includes five lenses. For example, the camera optical lens 10, from the object side to the image side, includes an aperture S1, a first lens L1, a second lens L2, a third lens L3, a fourth lens L4, and a fifth lens L5. A glass plate GF can be provided between the fifth lens L5 and an image plane Si, and the glass plate GF may be a glass cover plate, or an optical filter.

In the present embodiment, the first lens L1 has a positive refractive power; the second lens L2 has a negative refractive power; the third lens L3 has a negative refractive power; the fourth lens L4 has a positive refractive power; and the fifth lens L5 has a negative refractive power.

Herein, a focal length of the second lens is $f2$, a focal length of the camera optical lens is $f$, an on-axis thickness of the first lens is $d1$, an on-axis distance from an image side surface of the first lens to an object side surface of the second lens is $d2$, a curvature radius of an object side surface of the third lens is $R5$, a curvature radius of an image side surface of the third lens is $R6$, a curvature radius of an object side surface of the fifth lens is $R9$, an on-axis thickness of the fifth lens is $d9$, a curvature radius of an object side surface of the first lens is $R1$, and a curvature radius of the image side surface of the first lens is $R2$. The camera optical lens 10 further satisfies following conditions:

$$-3.50 \leq f2/f \leq -1.50 \quad (1);$$

$$10.00 \leq d1/d2 \leq 35.00 \quad (2);$$

$$1.80 \leq (R5+R6)/(R5-R6) \leq 8.00 \quad (3);$$

$$R9/d9 \leq -15.00 \quad (4); \text{ and}$$

$$-30.00 \leq R2/R1 \leq -10.00 \quad (5).$$

The condition (1) specifies a ratio of the focal length of the second lens to the total focal length of the system, which can effectively balance spherical aberration and field curvature of the system. For example, $-3.42 \leq f2/f \leq -1.52$.

The condition (2) specifies a ratio of the thickness of the first lens to an air gap between the first and second lenses. When this condition is satisfied, a total length of an optical system can be compressed, so as to achieve the ultra-thin lens. As an example, $10.50 \leq d1/d2 \leq 35.00$.

The condition (3) specifies a shape of the third lens. Within this range, it is conducive to correcting off-axis aberration with development towards ultra-thin and wide-angle lenses.

The condition (4) specifies a ratio of the curvature radius of the object side surface of the fifth lens to the thickness of the fifth lens, which facilitates the improvement of the performance of the optical system. As an example, $R9/d9 \leq -15.09$.

The condition (5) specifies a shape of the first lens. This condition can alleviate deflection of light passing through the lens while effectively reducing the aberrations.

A curvature radius of an image side surface of the second lens is defined as $R4$, and a focal length of the camera optical lens is defined as $f$. The camera optical lens 10 further satisfies a condition of $1.50 \leq R4/f \leq 10.00$, which specifies a ratio of the curvature radius of the image side surface of the second lens to the total focal length of the system. This condition can facilitate the improvement of the performance of the optical system within the range of the condition.

In the present embodiment, the object side surface of the first lens L1 is a convex surface in a paraxial region, and the image side surface thereof is a convex surface in the paraxial region.

A focal length of the first lens L1 is defined as $f1$, and a focal length of the camera optical lens is defined as $f$. The camera optical lens 10 further satisfies a condition of $0.36 \leq f1/f \leq 1.33$, which specifies a ratio of the focal length of the first lens L1 to the focal length. When this condition is satisfied, the first lens has appropriate positive refractive power, which is conducive to reducing system aberration, and is also conducive to the development towards the ultra-thin and wide-angle lenses. As an example, $0.58 \leq f1/f \leq 1.06$.

A curvature radius of an object side surface of the first lens L1 is defined as $R1$, and a curvature radius of an image side surface of the first lens L1 is defined as $R2$. The camera optical lens 10 further satisfies a condition of $-1.87 \leq (R1+R2)/(R1-R2) \leq -0.55$, which can reasonably control a shape of the first lens, allowing the first lens to effectively correct spherical aberration of the system. As an example, $-1.17 \leq (R1+R2)/(R1-R2) \leq -0.69$.

An on-axis thickness of the first lens L1 is $d1$, and a total optical length from the object side surface of the first lens L1 to an image plane of the camera optical lens 10 along an optic axis is defined as TTL. The camera optical lens 10 further satisfies a condition of $0.12 \leq d1/TTL \leq 0.46$, which is conducive to achieving ultra-thinness. As an example, $0.19 \leq d1/TTL \leq 0.37$.

In the present embodiment, the object side surface of the second lens L2 is a concave surface in a paraxial region, and the image side surface thereof is a concave surface in the paraxial region.

A curvature radius of an object side surface of the second lens L2 is defined as $R3$, and a curvature radius of an image side surface of the second lens L2 is defined as $R4$. The camera optical lens 10 further satisfies a condition of $-1.58 \leq (R3+R4)/(R3-R4) \leq 3.01$, which specifies a shape of the second lens L2. This condition can facilitate correction of an on-axis aberration with development towards ultra-thin lenses. As an example, $-0.99 \leq (R3+R4)/(R3-R4) \leq 2.41$.

An on-axis thickness of the second lens L2 is d3, and a total optical length from the object side surface of the first lens L1 to an image plane of the camera optical lens 10 along an optic axis is defined as TTL. The camera optical lens 10 further satisfies a condition of 0.02≤d3/TTL≤0.08, which is conducive to achieving the ultra-thinness. As an example, 0.03≤d3/TTL≤0.07.

In the present embodiment, the object side surface of the third lens L3 is a convex surface in a paraxial region, and the image side surface thereof is a concave surface in the paraxial region.

A focal length of the third lens L3 is defined as f3, and a focal length of the camera optical lens 10 is defined as f. The camera optical lens 10 further satisfies a condition of −8.11≤f3/f≤−1.23. The appropriate distribution of the refractive power leads to better imaging quality and a lower sensitivity of the system. As an example, −5.07≤f3/f≤−1.54.

An on-axis thickness of the third lens L3 is d5, and a total optical length from the object side surface of the first lens L1 to an image plane of the camera optical lens 10 along an optic axis is defined as TTL. The camera optical lens 10 further satisfies a condition of 0.02≤d5/TTL≤0.12, which is conducive to achieving the ultra-thinness. As an example, 0.04≤d5/TTL≤0.09.

In the present embodiment, the object side surface of the fourth lens L4 is a convex surface in a paraxial region, and the image side surface thereof is a convex surface in the paraxial region.

A focal length of the fourth lens L4 is defined as f4, and a focal length of the camera optical lens 10 is defined as f. The camera optical lens 10 further satisfies a condition of 0.32≤f4/f≤1.49, which specifies a ratio of the focal length of the fourth lens to the focal length of the system. This condition can facilitate the improvement of the performance of the optical system within the range of the condition. As an example, 0.52≤f4/f≤1.19.

A curvature radius of an object side surface of the fourth lens L4 is defined as R7, and a curvature radius of an image side surface of the fourth lens L4 is defined as R8. The camera optical lens 10 further satisfies a condition of the following condition: −0.75≤(R7+R8)/(R7−R8)≤0.65, which specifies a shape of the fourth lens L4. This condition can correct the off-axis aberration with development towards the ultra-thin and wide-angle lenses. As an example, −0.47≤(R7+R8)/(R7−R8)≤0.52.

An on-axis thickness of the fourth lens L4 is d7, and a total optical length from the object side surface of the first lens L1 to an image plane of the camera optical lens 10 along an optic axis is defined as TTL. The camera optical lens 10 further satisfies a condition of 0.05≤d7/TTL≤0.45, which is conducive to achieving ultra-thinness. As an example, 0.08≤d7/TTL≤0.36.

In the present embodiment, the object side surface of the fifth lens L5 is a concave surface in a paraxial region, and the image side surface thereof is a concave surface in the paraxial region.

A focal length of the fifth lens L5 is defined as f5, and a focal length of the camera optical lens 10 is defined as f. The camera optical lens 10 further satisfies a condition of −1.36≤f5/f≤−0.41. The limitations on the fifth lens L5 can effectively flatten a light angle of the camera lens, and reduce the tolerance sensitivity. As an example, −0.85≤f5/f≤−0.51.

A curvature radius of an object side surface of the fifth lens L5 is R9, and a curvature radius of an image side surface of the fifth lens L5 is R10. The camera optical lens 10 further satisfies a condition of 0.38≤(R9+R10)/(R9−R10) ≤1.37, which specifies a shape of the fifth lens L5. This condition can facilitate the correction of an off-axis aberration with development towards the ultra-thin and wide-angle lenses. As an example, 0.61≤(R9+R10)/(R9−R10)≤1.09.

An on-axis thickness of the fifth lens L5 is d9, and a total optical length from the object side surface of the first lens L1 to an image plane of the camera optical lens 10 along an optic axis is defined as TTL. The camera optical lens 10 further satisfies a condition of 0.03≤d9/TTL≤0.24, which is conducive to achieving the ultra-thinness. As an example, 0.04≤d9/TTL≤0.20.

In the present embodiment, a total optical length from the object side surface of the first lens L1 to an image plane of the camera optical lens 10 along an optic axis is defined as TTL, and an image height of the camera optical lens is IH. The camera optical lens 10 further satisfies a condition of TTL/IH≤2.00, thereby achieving ultra-thinness.

In the present embodiment, an F number (Fno) of the camera optical lens 10 is smaller than or equal to 3.17, thereby achieving a large aperture and good imaging performance. As an example, Fno≤3.11.

In the present embodiment, a focal length of the camera optical lens 10 is f, and a combined focal length of the first lens L1 and the second lens L2 is f12. The camera optical lens 10 further satisfies a condition of 0.49≤f12/f≤1.81. This condition can eliminate aberration and distortion of the camera optical lens 10, suppress the back focal length of the camera optical lens 10, and maintain the miniaturization of the camera lens system group. As an example, 0.78≤f12/f≤1.45.

In addition, in the camera optical lens 10 provided by the present embodiment, the surface of each lens is an aspherical surface, which is easy to be made into a shape other than a spherical surface, to obtain more control variables for reducing aberrations, thereby reducing a number of the required lenses. In this way, the total length of the camera optical lens 10 can be effectively reduced. In the present embodiment, the object side surface and the image side surface of each lens are all aspherical surfaces.

It should be noted that the first lens L1, the second lens L2, the third lens L3, the fourth lens L4, and the fifth lens L5 have the structure and parameter relations as described above, and therefore, the camera optical lens 10 can reasonably allocate the refractive power, spacing, and shape of the lens, and thus can correct various aberrations.

In addition, inflexion points and/or arrest points can be arranged on at least one of the object side surface and the image side surface of the lens, in order to satisfy the demand for the high quality imaging. The specific implementations are described below.

Design data of the camera optical lens 10 shown in FIG. 1 is shown below.

Table 1 lists the curvature radiuses R of the object side surface and the image side surface of the first lens L1 to the fifth lens L5 constituting the camera optical lens 10 in the first embodiment of the present disclosure, the on-axis thickness of each lens, the distance d between two adjacent lenses, the refractive index nd, and the abbe number vd. It should be noted that the focal length, the on-axis thickness, the curvature radius, the on-axis thickness between adjacent lenses, the inflection point position, and the Arrest point position are all in units of mm;

TTL: total optical length (total optical length from the object side surface of the first lens L1 to the image plane of the camera optical lens along the optic axis) in units of mm.

TABLE 1

|     | R       | d          |     | nd     |    | vd    |
|-----|---------|------------|-----|--------|----|-------|
| S1  | ∞       | d0 = −0.122|     |        |    |       |
| R1  | 1.594   | d1 = 1.232 | nd1 | 1.5444 | v1 | 55.82 |
| R2  | −29.552 | d2 = 0.052 |     |        |    |       |
| R3  | −6.868  | d3 = 0.219 | nd2 | 1.6700 | v2 | 19.39 |
| R4  | 17.475  | d4 = 0.172 |     |        |    |       |
| R5  | 6.610   | d5 = 0.246 | nd3 | 1.6700 | v3 | 19.39 |
| R6  | 2.525   | d6 = 0.183 |     |        |    |       |
| R7  | 1.637   | d7 = 0.506 | nd4 | 1.5661 | v4 | 37.71 |
| R8  | −3.607  | d8 = 0.274 |     |        |    |       |
| R9  | −26.596 | d9 = 0.263 | nd5 | 1.5346 | v5 | 55.69 |
| R10 | 1.219   | d10 = 0.250|     |        |    |       |
| R11 | ∞       | d11 = 0.210| ndg | 1.5168 | vg | 64.17 |
| R12 | ∞       | d12 = 0.409|     |        |    |       |

In the table, meanings of various symbols will be described as follows.

S1: aperture;

R: curvature radius of an optical surface; central curvature radius in the case of a lens;

R1: curvature radius of the object side surface of the first lens L1;

R2: curvature radius of the image side surface of the first lens L1;

R3: curvature radius of the object side surface of the second lens L2;

R4: curvature radius of the image side surface of the second lens L2;

R5: curvature radius of the object side surface of the third lens L3;

R6: curvature radius of the image side surface of the third lens L3;

R7: curvature radius of the object side surface of the fourth lens L4;

R8: curvature radius of the image side surface of the fourth lens L4;

R9: curvature radius of the object side surface of the fifth lens L5;

R10: curvature radius of the image side surface of the fifth lens L5;

R11: curvature radius of the object side surface of the optical filter GF;

R12: curvature radius of the image side surface of the optical filter GF;

d: on-axis thickness of the lens and on-axis thickness between the lenses;

d0: on-axis distance from the aperture S1 to the object side surface of the first lens L1;

d1: on-axis thickness of the first lens L1;

d2: on-axis distance from the image side surface of the first lens L1 to the object side surface of the second lens L2;

d3: on-axis thickness of the second lens L2;

d4: on-axis distance from the image side surface of the second lens L2 to the object side surface of the third lens L3;

d5: on-axis thickness of the third lens L3;

d6: on-axis distance from the image side surface of the third lens L3 to the object side surface of the fourth lens L4;

d7: on-axis thickness of the fourth lens L4;

d8: on-axis distance from the image side surface of the fourth lens L4 to the object side surface of the fifth lens L5;

d9: on-axis thickness of the fifth lens L5;

d10: on-axis thickness from the image side surface of the fifth lens L5 to the object side surface of the optical filter GF;

d11: on-axis thickness of the optical filter GF;

d12: on-axis thickness from the image side surface of the optical filter GF to the image plane;

nd: refractive index of the d-line;

nd1: refractive index of the d-line of the first lens L1;

nd2: refractive index of the d-line of the second lens L2;

nd3: refractive index of the d-line of the third lens L3;

nd4: refractive index of the d-line of the fourth lens L4;

nd5: refractive index of the d-line of the fifth lens L5;

ndg: refractive index of the d-line of the optical filter GF;

vd: abbe number;

v1: abbe number of the first lens L1;

v2: abbe number of the second lens L2;

v3: abbe number of the third lens L3;

v4: abbe number of the fourth lens L4;

v5: abbe number of the fifth lens L5; and vg: abbe number of the optical filter GF.

Table 2 shows aspheric surface data of respective lens in the camera optical lens 10 according to Embodiment 1 of the present disclosure.

TABLE 2

|     | Conic coefficient | Aspherical coefficient | | | |
|-----|-------------------|-------------|-------------|-------------|-------------|
|     | k                 | A4          | A6          | A8          | A10         |
| R1  | −1.0745E+01       | 2.9280E−01  | 3.7590E−01  | −1.2432E+01 | 1.0128E+02  |
| R2  | 9.1047E+02        | −9.6591E−02 | −2.9339E+00 | 2.4350E+01  | −1.2753E+02 |
| R3  | −2.9327E+01       | −1.0058E−01 | −1.0334E+00 | −8.5100E−01 | 4.8641E+01  |
| R4  | 2.8913E+02        | 7.3556E−02  | 6.0515E−01  | −1.1581E+01 | 7.9181E+01  |
| R5  | 4.5788E+01        | −5.1660E−01 | 3.0659E+00  | −1.6441E+01 | 5.8984E+01  |
| R6  | −5.5208E+01       | −6.9236E−01 | 3.0419E+00  | −1.2121E+01 | 3.3127E+01  |
| R7  | −1.6066E+01       | −1.9432E−01 | 7.9856E−01  | −2.3495E+00 | 4.0093E+00  |
| R8  | 2.2644E+00        | 4.6200E−02  | 2.8549E−01  | −4.3818E−01 | 2.5849E−01  |
| R9  | 7.9875E+01        | −6.9543E−01 | 9.0953E−01  | −7.5882E−01 | 5.1103E−01  |
| R10 | −7.7857E+00       | −3.3548E−01 | 3.7338E−01  | −3.0950E−01 | 1.8130E−01  |

|     | Aspherical coefficient | | | | |
|-----|-------------|-------------|-------------|-------------|-------------|
|     | A12         | A14         | A16         | A18         | A20         |
| R1  | −4.5818E+02 | 1.2464E+03  | −2.0232E+03 | 1.8060E+03  | −6.8212E+02 |
| R2  | 4.5505E+02  | −1.0406E+03 | 1.4531E+03  | −1.1267E+03 | 3.7038E+02  |
| R3  | −2.6494E+02 | 7.5557E+02  | −1.2458E+03 | 1.1194E+03  | −4.2481E+02 |
| R4  | −2.8781E+02 | 6.1493E+02  | −7.7536E+02 | 5.3435E+02  | −1.5506E+02 |
| R5  | −1.3439E+02 | 1.9245E+02  | −1.6980E+02 | 8.5540E+01  | −1.9377E+01 |
| R6  | −5.8005E+01 | 6.4394E+01  | −4.3985E+01 | 1.6852E+01  | −2.7654E+00 |
| R7  | −4.4078E+00 | 3.0137E+00  | −1.2048E+00 | 2.3845E−01  | −1.2670E−02 |

TABLE 2-continued

| | | | | |
|---|---|---|---|---|
| R8 | −6.5020E−02 | −1.5119E−03 | 4.8086E−03 | −1.0557E−03 | 7.7461E−05 |
| R9 | −2.6821E−01 | 9.8796E−02 | −2.3265E−02 | 3.1161E−03 | −1.8018E−04 |
| R10 | −7.5665E−02 | 2.2067E−02 | −4.2596E−03 | 4.8480E−04 | −2.4341E−05 |

In Table 2, k is the conic coefficient, and A4, A6, A8, A10, A12, A14, A16, A18, and A20 are aspherical coefficients.
IH: image height $$y=(x^2/R)/[1+\{1-(k+1)(x^2/R^2)\}^{1/2}]+A4x^4+A6x^6+A8x^8+A10x^{10}+A12x^{12}+A14x^{14}+A16x^{16}+A18x^{18}+A20x^{20} \quad (1)$$

In the present embodiment, an aspheric surface of each lens surface uses the aspheric surfaces represented by the above condition (1). However, the present disclosure is not limited to the aspherical polynomial form represented by the above condition (1).

Table 3 and Table 4 show design data of inflexion points and arrest points of respective lens in the camera optical lens 10 according to Embodiment 1 of the present disclosure. P1R1 and P1R2 represent the object side surface and the image side surface of the first lens L1, respectively; P2R1 and P2R2 represent the object side surface and the image side surface of the second lens L2, respectively; P3R1 and P3R2 represent the object side surface and the image side surface of the third lens L3, respectively; P4R1 and P4R2 represent the object side surface and the image side surface of the fourth lens L4, respectively; and P5R1 and P5R2 represent the object side surface and the image side surface of the fifth lens L5, respectively. The data in the column "inflexion point position" indicate vertical distances from inflexion points arranged on each lens surface to the optic axis of the camera optical lens 10. The data in the column "arrest point position" indicate vertical distances from arrest points arranged on each lens surface to the optic axis of the camera optical lens 10.

TABLE 3

| | Number of inflexion points | Inflexion point position 1 | Inflexion point position 2 | Inflexion point position 3 |
|---|---|---|---|---|
| P1R1 | 0 | | | |
| P1R2 | 3 | 0.575 | 0.765 | 0.815 |
| P2R1 | 2 | 0.545 | 0.775 | |
| P2R2 | 1 | 0.875 | | |
| P3R1 | 1 | 0.225 | | |
| P3R2 | 1 | 0.215 | | |
| P4R1 | 2 | 0.495 | 1.195 | |
| P4R2 | 2 | 0.455 | 0.835 | |
| P5R1 | 1 | 0.925 | | |
| P5R2 | 2 | 0.385 | 1.885 | |

TABLE 4

| | Number of Arrest points | Arrest point position 1 | Arrest point position 2 |
|---|---|---|---|
| P1R1 | 0 | | |
| P1R2 | 0 | | |
| P2R1 | 2 | 0.705 | 0.795 |
| P2R2 | 1 | 0.915 | |
| P3R1 | 1 | 0.485 | |
| P3R2 | 1 | 0.445 | |
| P4R1 | 2 | 0.825 | 1.275 |
| P4R2 | 0 | | |
| P5R1 | 0 | | |
| P5R2 | 1 | 0.875 | |

In addition, the following Table 13 also lists values corresponding to various parameters in the Embodiment 1 and parameters specified in the conditions.

Figure 2:
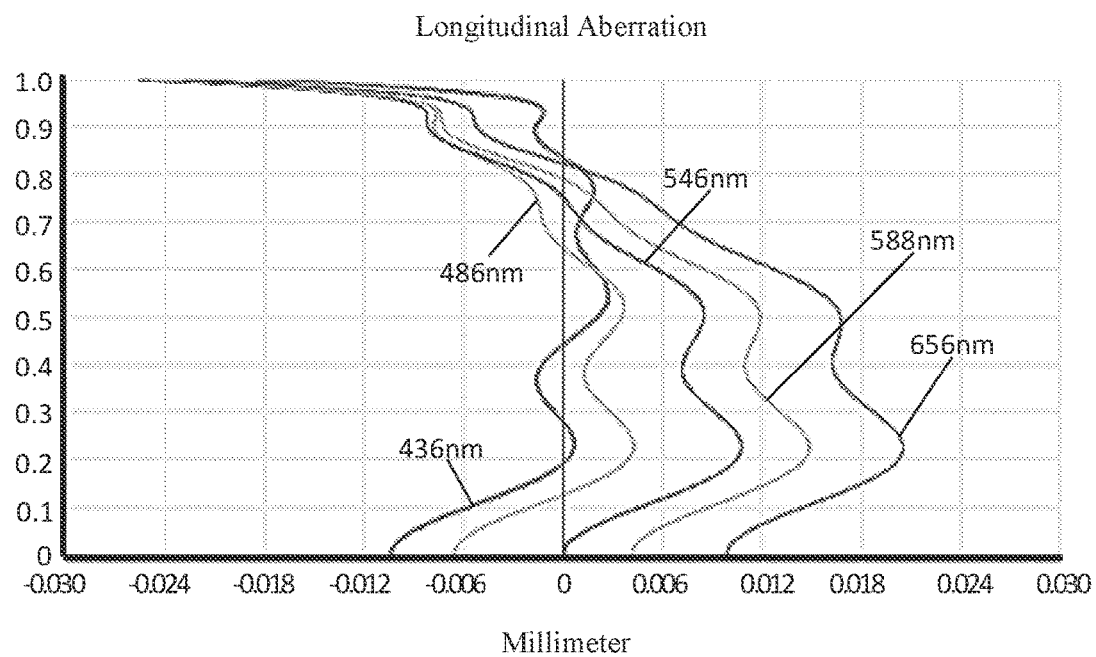
FIG. 2 is a schematic diagram of a longitudinal aberration of the camera optical lens shown in FIG. 1.
Figure 3:
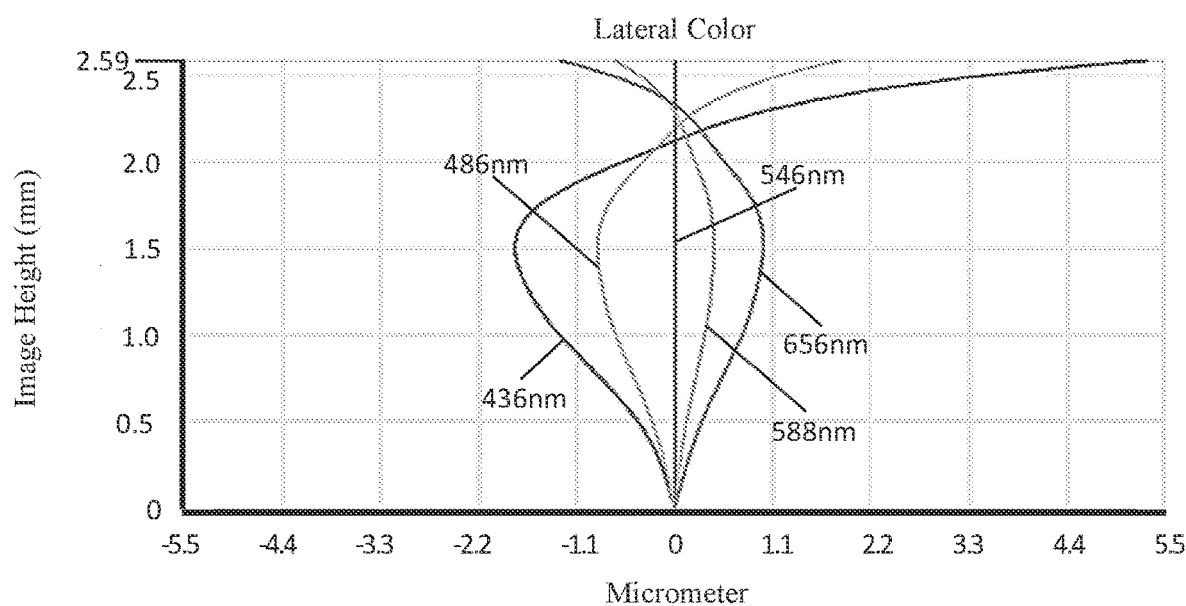
FIG. 3 is a schematic diagram of a lateral color of the camera optical lens shown in FIG. 1.
Figure 4:
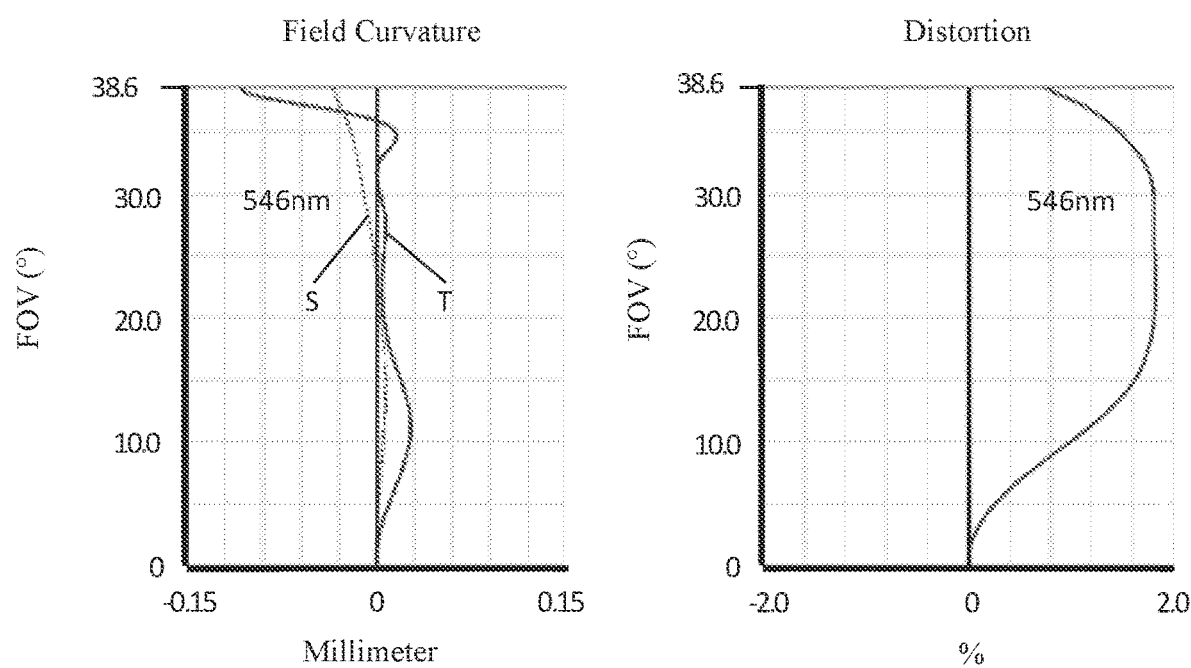
FIG. 4 is a schematic diagram of a field curvature and a distortion of the camera optical lens shown in FIG. 1.

FIG. 2 and FIG. 3 illustrate a longitudinal aberration and a lateral color of light with wavelengths of 436 nm, 486 nm, 546 nm, 588 nm and 656 nm after passing the camera optical lens 10 according to Embodiment 1. FIG. 4 illustrates a field curvature and a distortion of light with a wavelength of 546 nm after passing the camera optical lens 10 according to Embodiment 1. In FIG. 4, a field curvature S is a field curvature in a sagittal direction and T is a field curvature in a tangential direction.

In the present embodiment, the camera optical lens has an entrance pupil diameter of 1.410 mm, an image height of 2.589 mm, a field of view (FOV) along a diagonal direction of 48.48°. Thus, the camera optical lens 10 is ultra-thin, and has excellent optical characteristics.

Embodiment 2

Figure 5:
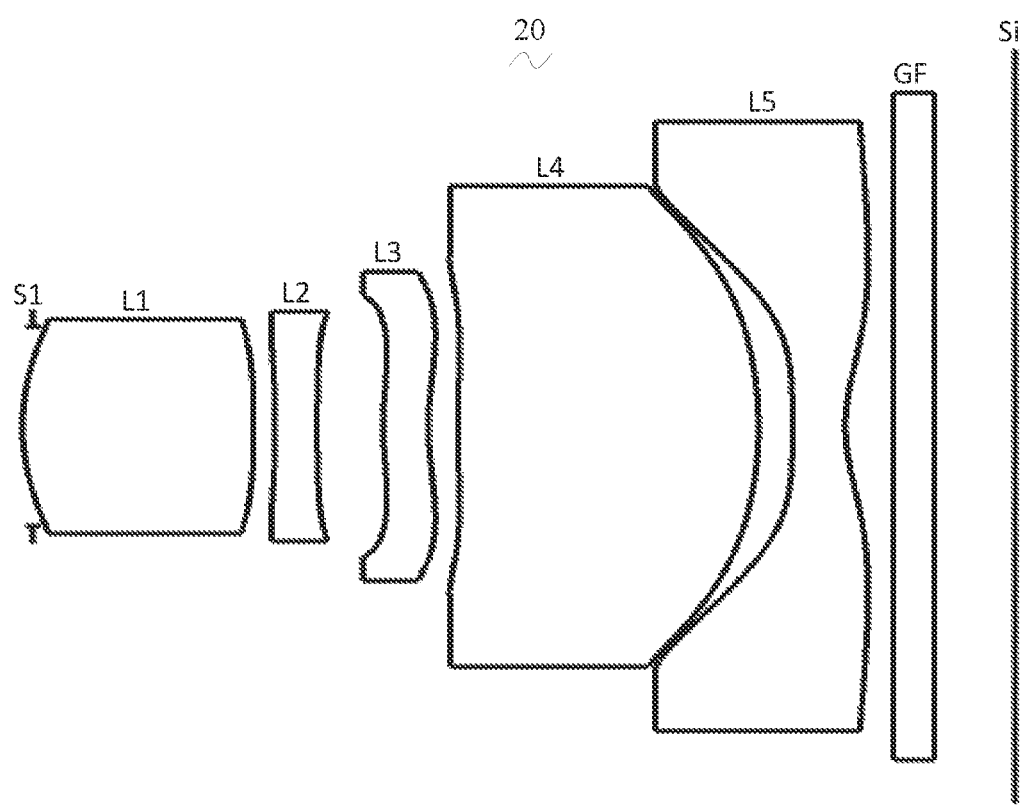
FIG. 5 is a structural schematic diagram of a camera optical a camera optical lens according to Embodiment 2 of the present disclosure.

FIG. 5 is a structural schematic diagram of a camera optical lens 20 according to the Embodiment 2. Embodiment 2 is basically the same as Embodiment 1 and involves symbols having the same meanings as Embodiment 1. Only differences therebetween will be described in the following.

The object side surface of the second lens L2 is a convex surface in the paraxial region.

Table 5 and Table 6 show design data of the camera optical lens 20 according to the Embodiment 2 of the present disclosure.

TABLE 5

| | R | d | | nd | | vd | |
|---|---|---|---|---|---|---|---|
| S1 | ∞ | d0 = | −0.055 | | | | |
| R1 | 1.937 | d1 = | 1.200 | nd1 | 1.5444 | v1 | 55.82 |
| R2 | −58.106 | d2 = | 0.109 | | | | |
| R3 | 19.052 | d3 = | 0.219 | nd2 | 1.6700 | v2 | 19.39 |
| R4 | 6.371 | d4 = | 0.344 | | | | |
| R5 | 2.835 | d5 = | 0.234 | nd3 | 1.6700 | v3 | 19.39 |
| R6 | 2.205 | d6 = | 0.154 | | | | |
| R7 | 7.988 | d7 = | 1.561 | nd4 | 1.5661 | v4 | 37.71 |
| R8 | −3.179 | d8 = | 0.176 | | | | |
| R9 | −26.006 | d9 = | 0.274 | nd5 | 1.5346 | v5 | 55.69 |
| R10 | 1.495 | d10 = | 0.250 | | | | |
| R11 | ∞ | d11 = | 0.210 | ndg | 1.5168 | vg | 64.17 |
| R12 | ∞ | d12 = | 0.422 | | | | |

Table 6 shows aspheric surface data of respective lenses in the camera optical lens 20 according to Embodiment 2 of the present disclosure.

TABLE 6

| | Conic coefficient | Aspherical coefficient | | | |
|---|---|---|---|---|---|
| | k | A4 | A6 | A8 | A10 |
| R1 | −1.7016E+01 | 3.3484E−01 | −1.7559E+00 | 1.3089E+01 | −7.6066E+01 |
| R2 | −9.9997E+02 | −7.6184E−01 | 6.3308E+00 | −5.2785E+01 | 3.1002E+02 |
| R3 | 1.7379E+02 | −1.0273E+00 | 9.0117E+00 | −7.0831E+01 | 4.2613E+02 |
| R4 | −3.8333E+02 | −3.0246E−01 | 1.3134E+00 | 9.9546E−01 | −2.2228E+01 |
| R5 | −7.7581E+01 | −1.9480E−01 | −1.7291E−01 | 6.6955E−01 | 2.3020E+00 |
| R6 | −1.2595E+02 | −3.9323E−01 | 6.3312E+00 | −1.1339E+00 | 2.3958E+00 |
| R7 | 4.2377E+01 | −1.3585E−01 | 6.0043E−02 | −3.8964E−01 | 1.8502E+00 |
| R8 | 8.2190E−01 | 5.6252E−02 | −1.7866E−01 | 2.2755E−01 | −1.9043E−01 |
| R9 | 1.9155E+02 | −3.4793E−01 | 6.3899E−02 | 3.1363E−01 | −4.8963E−01 |
| R10 | −4.0766E+00 | −3.4025E−01 | 3.4075E−01 | −2.2682E−01 | 1.0486E−01 |

| | Aspherical coefficient | | | | |
|---|---|---|---|---|---|
| | A12 | A14 | A16 | A18 | A20 |
| R1 | 2.9702E+02 | −7.5302E+02 | 1.1852E+03 | −1.0487E+03 | 3.9730E+02 |
| R2 | −1.1917E+03 | 2.9229E+03 | −4.3858E+03 | 3.6522E+03 | −1.2868E+03 |
| R3 | −1.7201E+03 | 4.4694E+03 | −7.1554E+03 | 6.4132E+03 | −2.4604E+03 |
| R4 | 8.8473E+01 | −1.8961E+02 | 2.3696E−02 | −1.6266E+02 | 4.7466E+01 |
| R5 | −1.8170E+01 | 4.6190E+01 | −6.1885E+01 | 4.4445E+01 | −1.3763E+01 |
| R6 | −4.5470E+00 | 5.1234E+00 | −2.7901E+00 | 4.2166E−01 | 1.0745E−01 |
| R7 | −4.1637E+00 | 5.0353E+00 | −3.3781E+00 | 1.1879E+00 | −1.7135E−01 |
| R8 | 1.0494E−01 | −3.4052E−02 | 5.0475E−03 | 4.9000E−05 | −6.7594E−05 |
| R9 | 3.8768E−01 | −1.8168E−01 | 5.0132E−02 | −7.4825E−03 | 4.6420E−04 |
| R10 | −3.3205E−02 | 7.0050E−03 | −9.3651E−04 | 7.1533E−05 | −2.3702E−06 |

Table 7 and Table 8 show design data of inflexion points and arrest points of respective lens in the camera optical lens 20 according to Embodiment 2 of the present disclosure.

TABLE 7

| | Number of inflexion points | Inflexion point position 1 | Inflexion point position 2 | Inflexion point position 3 | Inflexion point position 4 |
|---|---|---|---|---|---|
| P1R1 | 0 | | | | |
| P1R2 | 1 | 0.705 | | | |
| P2R1 | 3 | 0.075 | 0.445 | 0.725 | |
| P2R2 | 2 | 0.235 | 0.275 | | |
| P3R1 | 1 | 0.265 | | | |
| P3R2 | 2 | 0.325 | 1.035 | | |
| P4R1 | 3 | 0.305 | 1.005 | 1.215 | |
| P4R2 | 1 | 1.515 | | | |
| P5R1 | 1 | 1.335 | | | |
| P5R2 | 2 | 0.435 | 1.895 | | |

TABLE 8

| | Number of Arrest points | Arrest point position 1 | Arrest point position 2 | Arrest point position 3 |
|---|---|---|---|---|
| P1R1 | 0 | | | |
| P1R2 | 0 | | | |
| P2R1 | 3 | 0.125 | 0.635 | 0.745 |
| P2R2 | 0 | | | |
| P3R1 | 1 | 0.505 | | |
| P3R2 | 2 | 0.635 | 1.095 | |
| P4R1 | 2 | 0.535 | 1.165 | |
| P4R2 | 0 | | | |
| P5R1 | 0 | | | |
| P5R2 | 1 | 1.165 | | |

In addition, the following Table 13 also lists values corresponding to various parameters in the Embodiment 1 and parameters specified in the conditions.

Figure 6:
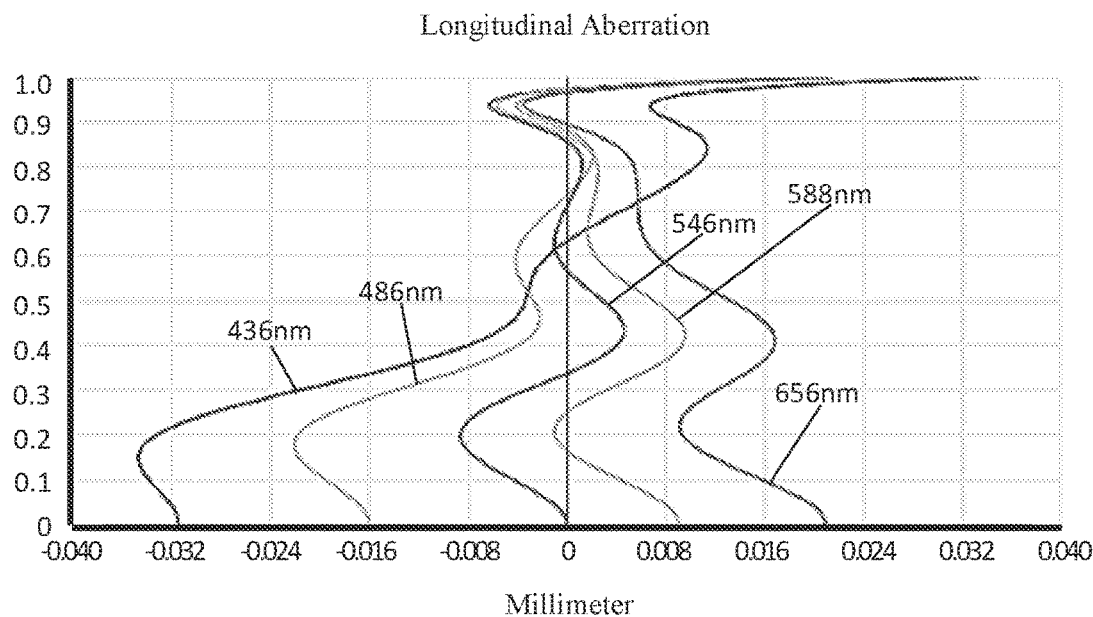
FIG. 6 is a schematic diagram of a longitudinal aberration of the camera optical lens shown in FIG. 5.
Figure 7:
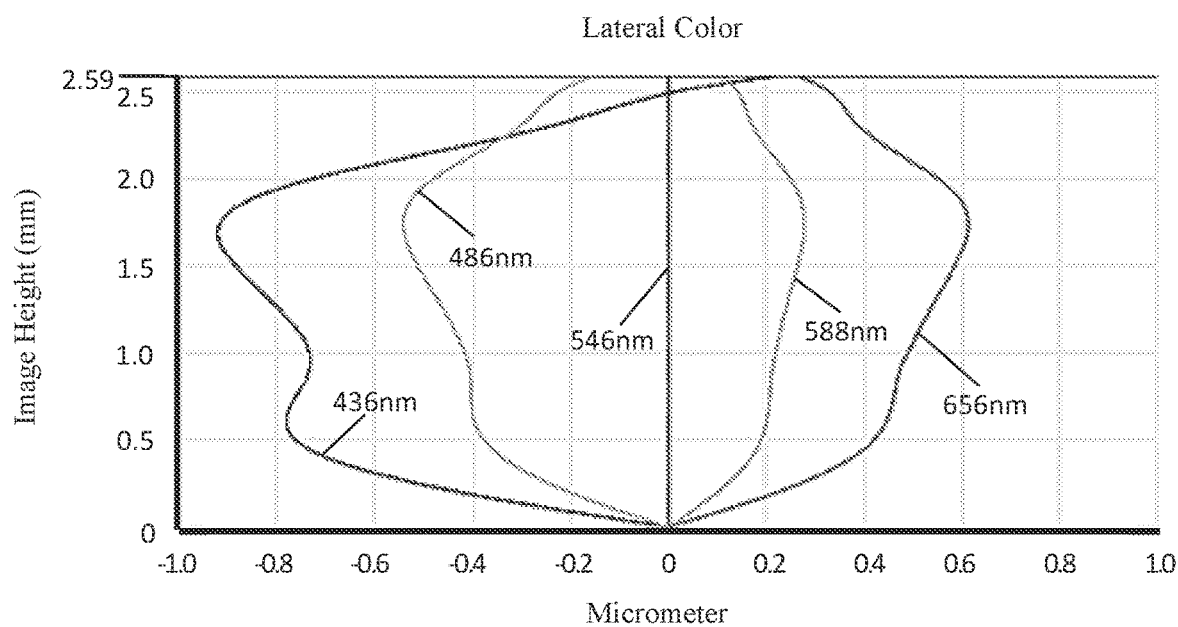
FIG. 7 is a schematic diagram of a lateral color of the camera optical lens shown in FIG. 5.
Figure 8:
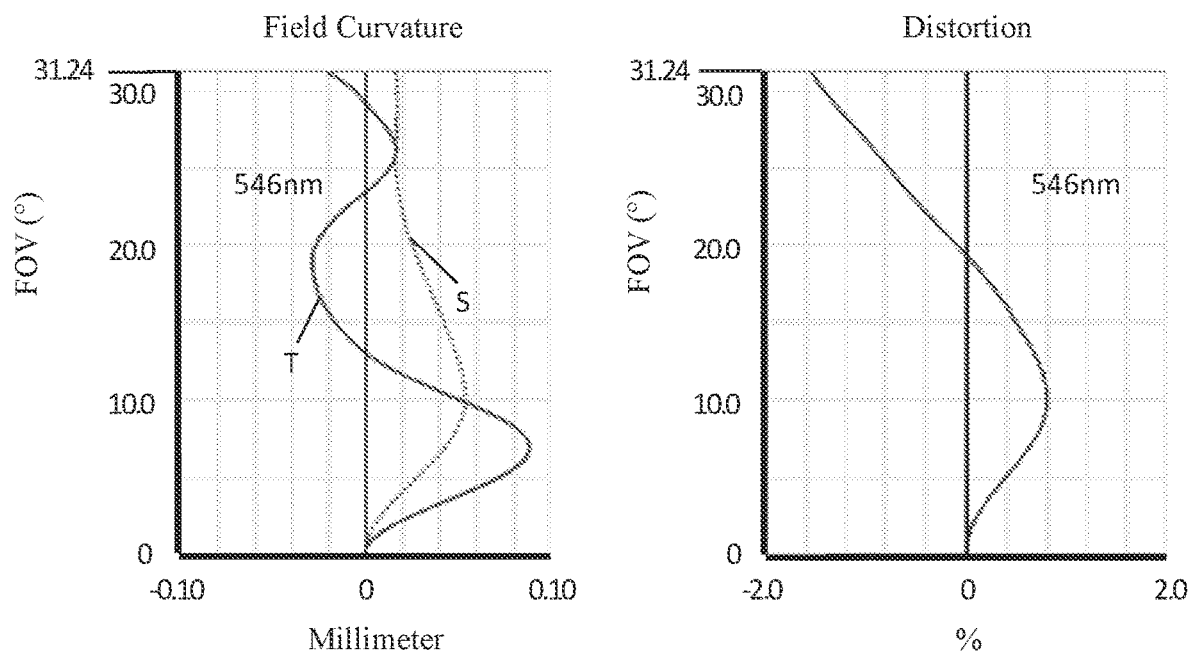
FIG. 8 is a schematic diagram of a field curvature and a distortion of the camera optical lens shown in FIG. 5.

FIG. 6 and FIG. 7 illustrate a longitudinal aberration and a lateral color of light with wavelengths of 436 nm, 486 nm, 546 nm, 588 nm and 656 nm after passing the camera optical lens 20 according to Embodiment 1. FIG. 8 illustrates a field curvature and a distortion of light with a wavelength of 546 nm after passing the camera optical lens 20 according to Embodiment 2. In FIG. 8, a field curvature S is a field curvature in a sagittal direction and T is a field curvature in a tangential direction.

In the present embodiment, the camera optical lens 20 has an entrance pupil diameter of 1.380 mm, an image height of 2.589 mm, a FOV along a diagonal direction of 62.48°. Thus, the camera optical lens 20 is ultra-thin, and has excellent optical characteristics.

Embodiment 3

Figure 9:
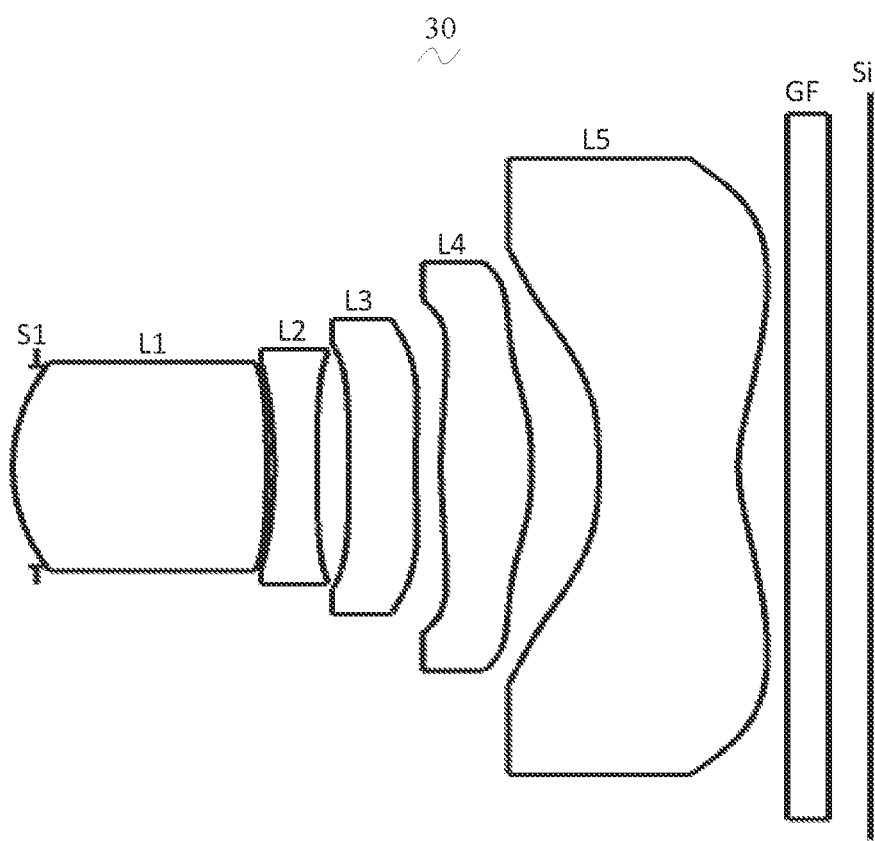
FIG. 9 is a structural schematic diagram of a camera optical a camera optical lens according to Embodiment 3 of the present disclosure.

FIG. 9 is a structural schematic diagram of a camera optical lens 30 according to the Embodiment 3. Embodiment 3 is basically the same as Embodiment 1 and involves symbols having the same meanings as Embodiment 1. Only differences therebetween will be described in the following.

Table 9 and Table 10 show design data of the camera optical lens 30 according to the Embodiment 3 of the present disclosure.

TABLE 9

| | R | d | | nd | | vd | |
|---|---|---|---|---|---|---|---|
| S1 | ∞ | d0 = | −0.122 | | | | |
| R1 | 1.514 | d1 = | 1.295 | nd1 | 1.5444 | v1 | 55.82 |
| R2 | −15.892 | d2 = | 0.037 | | | | |
| R3 | −4.136 | d3 = | 0.219 | nd2 | 1.6700 | v2 | 19.39 |
| R4 | 35.536 | d4 = | 0.159 | | | | |
| R5 | 10.938 | d5 = | 0.340 | nd3 | 1.6700 | v3 | 19.39 |
| R6 | 3.127 | d6 = | 0.132 | | | | |
| R7 | 2.842 | d7 = | 0.463 | nd4 | 1.5661 | v4 | 37.71 |
| R8 | −3.527 | d8 = | 0.343 | | | | |
| R9 | −10.786 | d9 = | 0.711 | nd5 | 1.5346 | v5 | 55.69 |
| R10 | 1.446 | d10 = | 0.250 | | | | |
| R11 | ∞ | d11 = | 0.210 | ndg | 1.5168 | vg | 64.17 |
| R12 | ∞ | d12 = | 0.212 | | | | |

Table 10 shows aspheric surface data of respective lenses in the camera optical lens 30 according to Embodiment 3 of the present disclosure.

TABLE 10

| | Conic coefficient | Aspherical coefficient | | | |
|---|---|---|---|---|---|
| | k | A4 | A6 | A8 | A10 |
| R1 | −9.4171E+00 | 2.2734E−01 | 1.8009E+00 | −2.5787E+01 | 1.7726E+02 |
| R2 | 3.1613E+02 | −1.6811E−01 | 1.3851E+00 | −1.0246E+01 | 2.8872E+01 |
| R3 | −6.7472E+01 | −3.4082E−02 | −1.1894E+00 | 2.3213E+01 | −2.2264E+02 |
| R4 | 9.1508E+02 | −7.8488E−02 | 2.3180E+00 | −1.5423E+01 | 6.0607E+01 |
| R5 | −5.4878E+00 | −5.9784E−01 | 3.5629E+00 | −2.0075E+01 | 8.0851E+01 |
| R6 | −7.8992E+01 | −7.2611E−01 | 3.3495E+00 | −1.2072E+01 | 3.0039E+01 |
| R7 | −7.6795E+01 | −5.4898E−01 | 2.2779E+00 | −5.1345E+00 | 7.2269E+00 |
| R8 | 4.2938E+00 | −4.6155E−01 | 1.6060E+00 | −2.3591E+00 | 2.1603E+00 |
| R9 | 4.3570E+01 | −8.4666E−01 | 1.9940E+00 | −2.9107E+00 | 2.6291E+00 |
| R10 | −1.4901E+01 | −1.6675E−01 | 2.6073E−01 | −2.5342E−01 | 1.5262E−01 |

| | Aspherical coefficient | | | | |
|---|---|---|---|---|---|
| | A12 | A14 | A16 | A18 | A20 |
| R1 | −7.3133E+02 | 1.8703E+03 | −2.8987E+03 | 2.4916E+03 | −9.1031E+02 |
| R2 | −4.5783E+01 | 1.5982E+02 | −5.5485E+02 | 8.4491E+02 | −4.5070E+02 |
| R3 | 1.1282E+03 | −3.2791E+03 | 5.5839E+03 | −5.2503E+03 | 2.1267E+03 |
| R4 | −1.5156E+02 | 2.5082E+02 | −2.7104E+02 | 1.7386E+02 | −4.9889E+01 |
| R5 | −2.2724E+02 | 4.2645E+02 | −5.0220E+02 | 3.3304E+02 | −9.4682E+01 |
| R6 | −5.2207E+01 | 6.0993E+01 | −4.4673E+01 | 1.8181E+01 | −3.0705E+00 |
| R7 | −6.5264E+00 | 3.2311E+00 | −2.5158E+00 | −5.3304E−01 | 1.8286E−01 |
| R8 | −1.3085E+00 | 5.1531E−01 | −1.2557E−01 | 1.7064E−02 | −9.8229E−04 |
| R9 | −1.4445E+00 | 4.7451E−01 | −8.8140E−02 | 7.9687E−03 | −2.1772E−04 |
| R10 | −5.9495E−02 | 1.5026E−02 | −2.3749E−03 | 2.1288E−04 | −8.2082E−06 |

Table 11 and Table 12 show design data of inflexion points and arrest points of respective lens in the camera optical lens 30 according to Embodiment 3 of the present disclosure.

TABLE 11

| | Number of inflexion points | Inflexion point position 1 | Inflexion point position 2 | Inflexion point position 3 | Inflexion point position 4 |
|---|---|---|---|---|---|
| P1R1 | 0 | | | | |
| P1R2 | 2 | 0.705 | 0.785 | | |
| P2R1 | 1 | 0.695 | | | |
| P2R2 | 0 | | | | |
| P3R1 | 1 | 0.135 | | | |
| P3R2 | 1 | 0.195 | | | |
| P4R1 | 3 | 0.235 | 0.465 | 0.625 | |
| P4R2 | 2 | 0.565 | 1.025 | | |
| P5R1 | 2 | 1.005 | 1.355 | | |
| P5R2 | 2 | 0.465 | 2.105 | | |

TABLE 12

| | Number of Arrest points | Arrest point position 1 | Arrest point position 2 |
|---|---|---|---|
| P1R1 | 0 | | |
| P1R2 | 0 | | |
| P2R1 | 1 | 0.735 | |
| P2R2 | 0 | | |
| P3R1 | 1 | 0.245 | |
| P3R2 | 1 | 0.415 | |
| P4R1 | 1 | 0.805 | |
| P4R2 | 0 | | |
| P5R1 | 0 | | |
| P5R2 | 1 | 1.305 | |

In addition, the following Table 13 also lists values corresponding to various parameters in the Embodiment 1 and parameters specified in the conditions.

Figure 10:
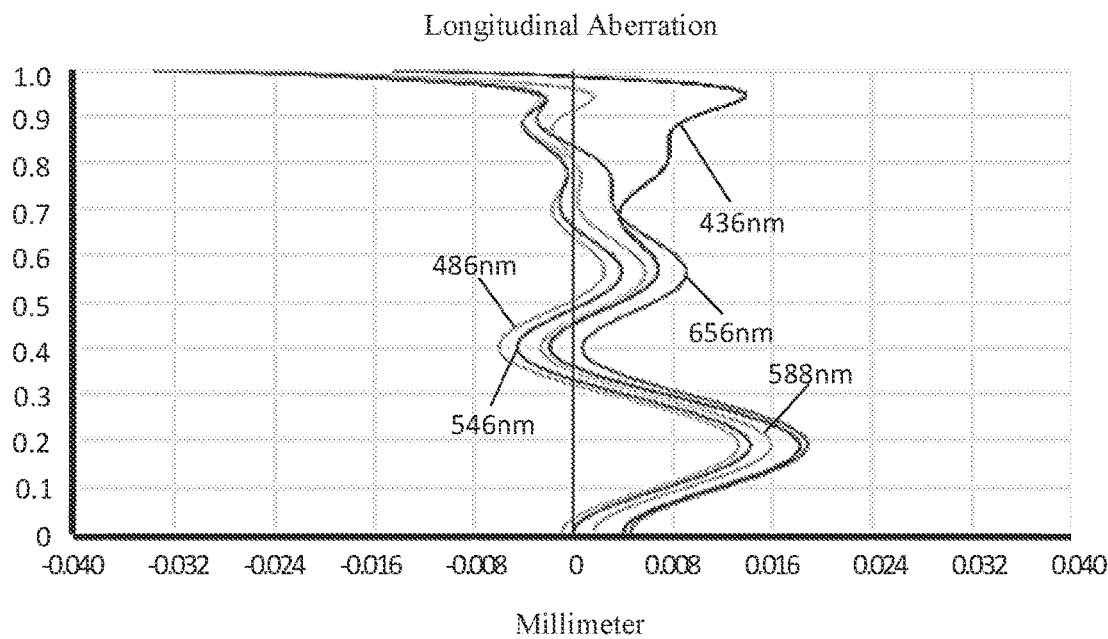
FIG. 10 is a schematic diagram of a longitudinal aberration of the camera optical lens shown in FIG. 9.
Figure 11:
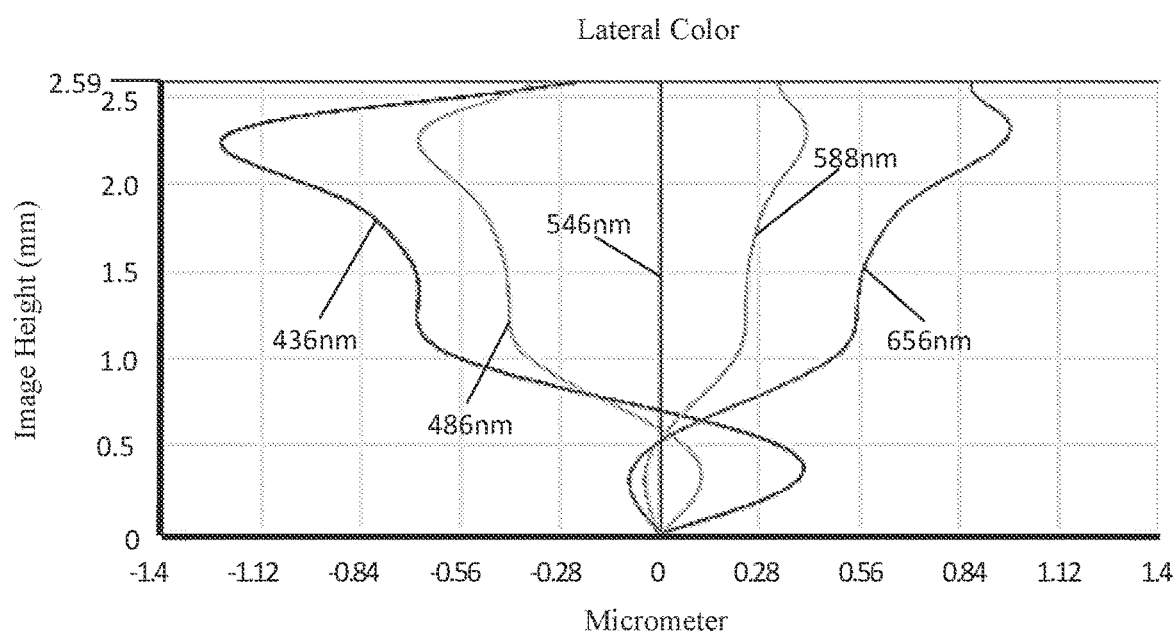
FIG. 11 is a schematic diagram of a lateral color of the camera optical lens shown in FIG. 9.
Figure 12:
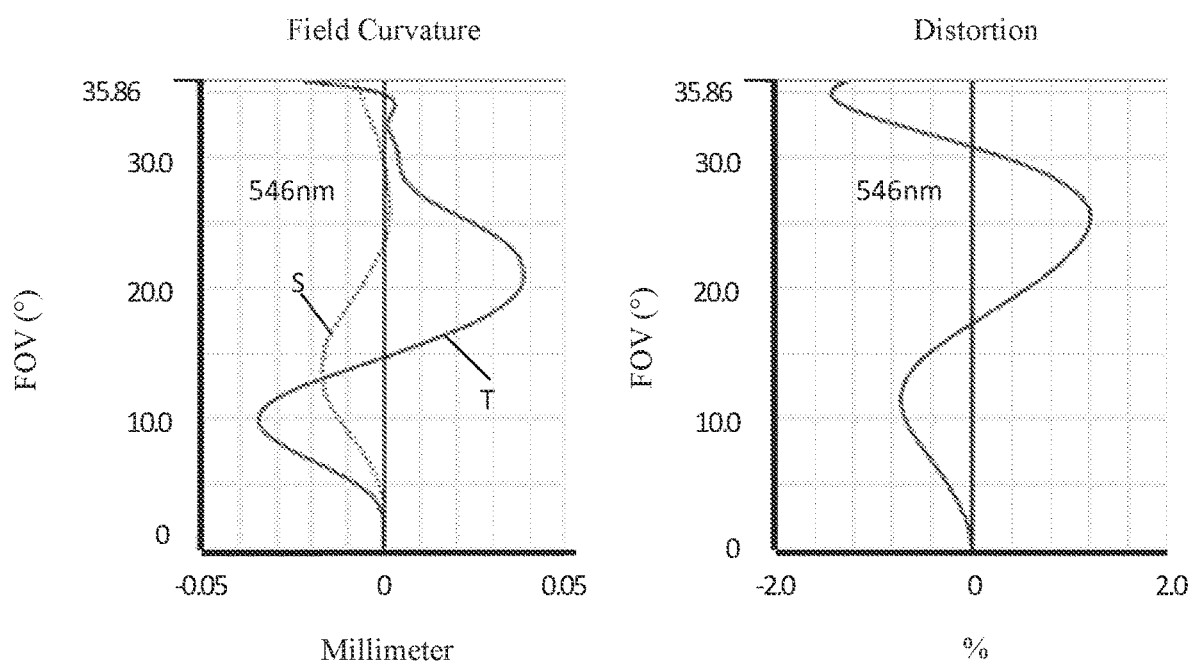
FIG. 12 is a schematic diagram of a field curvature and a distortion of the camera optical lens shown in FIG. 9.

FIG. 10 and FIG. 11 illustrate a longitudinal aberration and a lateral color of light with wavelengths of 436 nm, 486 nm, 546 nm, 588 nm and 656 nm after passing the camera optical lens 30 according to Embodiment 3. FIG. 12 illustrates a field curvature and a distortion of light with a wavelength of 546 nm after passing the camera optical lens 10 according to Embodiment 1. In FIG. 12, a field curvature S is a field curvature in a sagittal direction and T is a field curvature in a tangential direction.

In the present embodiment, the camera optical lens 30 has an entrance pupil diameter of 1.410 mm, an image height of 2.589 mm, a FOV along a diagonal direction of 71.72°. Thus, the camera optical lens 30 is ultra-thin, and has excellent optical characteristics.

The following Table 13 lists values of corresponding conditions in the first embodiment, the Embodiment 2, the Embodiment 3, and the fourth implementation, and values of other related parameters according to the above conditions.

TABLE 13

| Parameters and condition | Embodiment 1 | Embodiment 2 | Embodiment 3 |
|---|---|---|---|
| f | 3.175 | 4.247 | 3.562 |
| f1 | 2.805 | 3.453 | 2.596 |
| f2 | −7.244 | −14.215 | −5.452 |
| f3 | −6.174 | −17.212 | −6.573 |
| f4 | 2.048 | 4.205 | 2.838 |
| f5 | −2.164 | −2.624 | −2.328 |
| f12 | 3.839 | 4.151 | 3.834 |
| Fno | 2.25 | 3.08 | 2.53 |
| f2/f | −2.28 | −3.35 | −1.53 |
| d1/d2 | 23.69 | 11.01 | 35.00 |
| (R5 + R6)/(R5 − R6) | 2.24 | 8.00 | 1.80 |

TABLE 13-continued

| Parameters and condition | Embodiment 1 | Embodiment 2 | Embodiment 3 |
|---|---|---|---|
| R9/d9 | −101.13 | −94.91 | −15.17 |
| R2/R1 | −18.54 | −30.00 | −10.50 |

The above description is only some embodiments of the present disclosure. It should be understood that those skilled in the art can make various modifications to these embodiments without departing from the spirit and scope of the present disclosure, and those modification shall fall within the protection scope of the present disclosure.

What is claimed is:

1. A camera optical lens, comprising, from an object side to an image side:
   a first lens having a positive refractive power;
   a second lens having a negative refractive power;
   a third lens having a negative refractive power;
   a fourth lens having a positive refractive power; and
   a fifth lens having a negative refractive power,
   wherein the camera optical lens satisfies following conditions:

$-3.50 \leq f2/f \leq -1.50$;

$10.00 \leq d1/d2 \leq 35.00$;

$1.80 \leq (R5+R6)/(R5-R6) \leq 8.00$;

$R9/d9 \leq -15.00$; and $-30.00 \leq R2/R1 \leq -10.00$, where
   f denotes a focal length of the camera optical lens;
   f2 denotes a focal length of the second lens;
   d1 denotes an on-axis thickness of the first lens;
   d2 denotes an on-axis distance from an image side surface of the first lens to an object side surface of the second lens;
   R5 denotes a curvature radius of an object side surface of the third lens;
   R6 denotes a curvature radius of an image side surface of the third lens;
   R9 denotes a curvature radius of an object side surface of the fifth lens;
   d9 denotes an on-axis thickness of the fifth lens;
   R1 denotes a curvature radius of an object side surface of the first lens;
   R2 denotes a curvature radius of the image side surface of the first lens.

2. The camera optical lens as described in claim 1, further satisfying a following condition:

$1.50 \leq R4/f \leq 10.00$, where
   R4 denotes a curvature radius of an image side surface of the second lens.

3. The camera optical lens as described in claim 1, further satisfying following conditions:

$0.36 \leq f1/f \leq 1.33$;

$-1.87 \leq (R1+R2)/(R1-R2) \leq -0.55$; and $0.12 \leq d1/TTL \leq 0.46$, where
   f1 denotes a focal length of the first lens; and
   TTL denotes a total optical length from the object side surface of the first lens to an image plane of the camera optical lens along an optic axis.

4. The camera optical lens as described in claim 1, further satisfying following conditions:

$-1.58 \leq (R3+R4)/(R3-R4) \leq 3.01$; and $0.02 \leq d3/TTL \leq 0.08$, where
   R3 denotes a curvature radius of the object side surface of the second lens;
   R4 denotes a curvature radius of an image side surface of the second lens;
   d3 denotes an on-axis thickness of the second lens; and
   TTL denotes a total optical length from the object side surface of the first lens to an image plane of the camera optical lens along an optic axis.

5. The camera optical lens as described in claim 1, further satisfying following conditions:

$-8.11 \leq f3/f \leq -1.23$; and $0.02 \leq d5/TTL \leq 0.12$, where
   f3 denotes a focal length of the third lens;
   d5 denotes an on-axis thickness of the third lens; and
   TTL denotes a total optical length from the object side surface of the first lens to an image plane of the camera optical lens along an optic axis.

6. The camera optical lens as described in claim 1, further satisfying following conditions:

$0.32 \leq f4/f \leq 1.49$;

$-0.75 \leq (R7+R8)/(R7-R8) \leq 0.65$; and $0.05 \leq d7/TTL \leq 0.45$, where
   f4 denotes a focal length of the fourth lens;
   R7 denotes a curvature radius of an object side surface of the fourth lens;
   R8 denotes a curvature radius of an image side surface of the fourth lens;
   d7 denotes an on-axis thickness of the fourth lens; and
   TTL denotes a total optical length from the object side surface of the first lens to an image plane of the camera optical lens along an optic axis.

7. The camera optical lens as described in claim 1, further satisfying following conditions:

$-1.36 \leq f5/f \leq -0.41$;

$0.38 \leq (R9+R10)/(R9-R10) \leq 1.37$; and $0.03 \leq d9/TTL \leq 0.24$, where
   f5 denotes a focal length of the fifth lens;
   R10 denotes a curvature radius of an image side surface of the fifth lens; and
   TTL denotes a total optical length from the object side surface of the first lens to an image plane of the camera optical lens along an optic axis.

8. The camera optical lens as described in claim 1, further satisfying a following condition:

$TTL/IH \leq 2.00$, where

TTL denotes a total optical length from the object side surface of the first lens to an image plane of the camera optical lens along an optic axis; and IH denotes an image height of the camera optical lens.

9. The camera optical lens as described in claim 1, further satisfying a following condition:

$$0.49 \leq f12/f \leq 1.81,$$

where f12 denotes a combined focal length of the first lens and the second lens.

10. The camera optical lens as described in claim 1, further satisfying a following condition:

$$Fno \leq 3.17,$$

where

Fno denotes an F number of the camera optical lens.

* * * * *